United States Patent [19]
Griffiths et al.

[11] Patent Number: 4,805,682
[45] Date of Patent: Feb. 21, 1989

[54] TIRE BEAD TOE WITH SLITS

[75] Inventors: Phillip N. Griffiths, Sutton; Mathew Simpson, Birmingham, both of United Kingdom

[73] Assignee: S P Tyres UK Limited, Birmingham, England

[21] Appl. No.: 74,056

[22] Filed: Jul. 16, 1987

[30] Foreign Application Priority Data

Jul. 16, 1986 [GB] United Kingdom ............... 8617411

[51] Int. Cl.⁴ .......................... B60C 15/02; B60C 5/16
[52] U.S. Cl. .................................. 152/544; 152/379.5
[58] Field of Search ................. 152/379.5, 544, 379.3, 152/379.4, 379.5, DIG. 9

[56] References Cited

U.S. PATENT DOCUMENTS 4,148,348 4/1979 French et al. ..................... 152/544
4,209,051 6/1980 Udall ................................. 152/544

Primary Examiner—Michael Ball
Attorney, Agent, or Firm—Birch, Stewart, Kolasch & Birch

[57] ABSTRACT

A tire comprising a tread portion, sidewalls and a pair of spaced-apart beads each containing a substantially enextensible annular bead core, having bead seats and an extended toe portion comprising elastomeric material extending axially and radially inwards of the bead, the toe being of a rigidity in the direction of its length so that in use of the tire on a wheel rim having a groove complementary to the toe and engaging the toe when an axially inward force is applied to the tread portion a radially and axially outwardly directed force is generated at the bead core to affect bead retention characterized by the toe being subdivided in the circumferential direction of the tire by a series of substantially radial cuts in the toe such that circumferentially adjacent portions of the toe are decoupled from one another and dislodgement or misplacement of one of said portions does not dislodge or displace an adjacent portion. Preferably the cuts are equally spaced around the tire and they are through the whole cross section of the toe.

8 Claims, 1 Drawing Sheet

TIRE BEAD TOE WITH SLITS

BACKGROUND AND SUMMARY OF THE INVENTION

The present invention relates to tires and in particular to the bead regions of tires of the type disclosed in UK patent specification No. 1,584 553. Such tires incorporate an axially and radially inwardly projecting toe having two distinct physical properties which provide a unique bead retention feature even when fitted to a one piece wheel rim of the required type. Some tires of this type are known as "TD" tires.

The physical properties of the toe are: firstly a substantial form stiffness in the direction of the length of the toe so that the toe resists compressive force applied between the inward end of the bead toe and the bead reinforcement core and secondly a reasonable degree of flexibility perpendicular to its length when not under longitudinal compression to allow fitting and stripping of the tyre to and from its one piece wheel rim.

It has been discovered that one possible mode of dislodgement for tires of this type is for the bead to helix or spiral off its seat. In this action dislodgement or partial dislodgement past the groove towards the well at one part of the circumference advances circumferentially around the tire such that after a couple of reductions or more the bead has advanced inwards to the well and full dislodgement occurs. This may occur more readily if a part of the toe is not completely engaged in the groove or if an obstruction is in the groove.

One object of the present invention is to provide a means of avoiding problems of this type by modifying the toe of the tire to effectively decouple adjacent parts of the said toe in the circumferential direction.

According to the present invention a tire comprises a tread portion, sidewalls and a pair of spaced-apart beads each containing a substantially inextensible annular bead core, having bead seats and an extended toe portion comprising an elastomic material extending axially and radially inwards of the bead, the toe being rigid in the direction of its length so that in use of the tire on a wheel rim having a groove complementary to the toe and engaging the toe, when an axially outwardly directed force is generated at the bead core bead retention is affected. The toe of the tire is subdivided in the circumferential direction of the tire by a series of substantially radial cuts in the toe such that circumferentially adjacent portions of the toe are decoupled from one another and dislodgement or displacement of one of said portions does not displace an adjacent portion.

The radial cuts preferably each extend through the whole cross section of the toe. Alternatively the cuts may extend throughout less than 60% of the toe in which case the cuts preferably extend from the axially outer surface of the toe to the centre line of the length of the toe but not to the axially inner surface of the toe.

The cuts are preferably equally spaced around the circumference of the tire and there may be more than 6 cuts. The cuts may be very narrow and have substantially no width in the manner of tread sipes or may be wider but not more than 4 mm.

Further aspects of the present invention will be apparent from the following description, by way of example only, of some embodiments in conjunction with the attached diagrammatic drawings in which:

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

Figure 1:
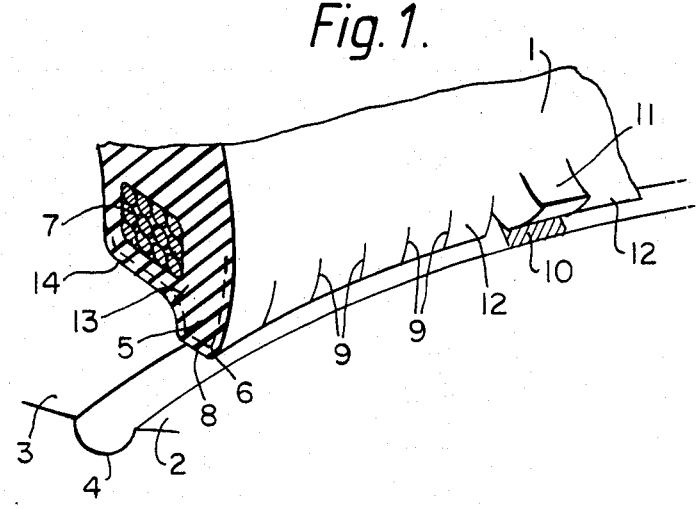
FIG. 1. is a perspective view of part of a tire bead partly fitted to a section of wheel rim.

FIG. 1. shows a short section of tire bead 1 positioned above a section of wheel rim 2. The tire is a 185/65R365 radial tire. The wheel rim 2 has a bead seating region 3 and a "TD" type of toe engaging groove 4. The tire bead 1 has an axially and radially inwardly projecting toe 5 which is formed of hard rubber and reinforced by a chafer or skin fabric layer 6. The toe 5 extends from a bead reinforcement hoop 7 to a toe tip 8. All of this construction is typical of the "TD" type of tire as described in UK patent specification No. 1584 553.

Figure 2:
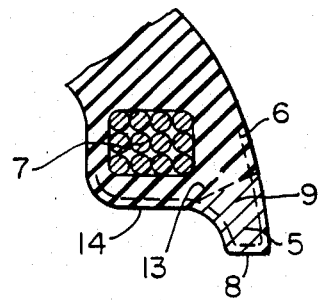
FIG. 2. is a part cross section of the bead of FIG. 1.

The tire toe is divided into short 10 mm lengths circumferentially of the tire by radial knife cuts 9 as can be seen. The knife cuts 9 are substantially for the whole length of the toe and are shown by the shaded area in FIG. 2. The knife cuts 9 cut the rubber and the reinforcement fabric layer 6 and they decouple and physically separate each adjacent section of toe from its neighbour.

The result is that if the tire is fitted to a wheel rim with an obstruction 10 in a part of the groove 4 or if part of the toe 11 fails to completely enter the groove then the parts of the toe 12 immediately adjacent to the misplaced part 11 are still able to correctly enter the groove and in dislodgement tests the two parts 11 and 12 do not interact and cause the "spiralling off" or the helix type of dislodgement.

The toe also is decoupled from the main part of the bead by means of a radially outwardly and axially inwardly directed additional decoupling cut or groove 13. This cut 13 is positioned at the junction of the bead seat 14 and the toe such that it reduces the toe's resistance to bending perpendicular to its own length. This allows the displaced part 11 to more easily bend as shown to allow the tire bead to seat correctly on its bead seat 3.

Figure 3:
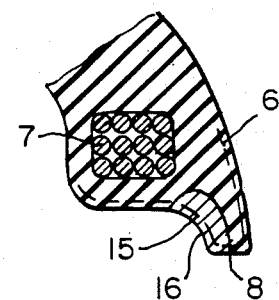
FIG. 3. is a part cross section of an alternative bead.

The embodiment shown in FIG. 3 has smaller section cuts shown by the shaded area 15. The cut area 15 is about 60% of the cross sectional area of the toe and extends from the axially outer surface 16 of the toe towards the center line of the length of the toe. These cuts 15 produce the same effect as the cut 9 in the first embodiment and provide an alternative which may be in some circumstances advantageous.

The width of the cuts may be up to 4 mm but is sufficiently small to allow tire seating by the usual application of an air line to the tire and wheel assembly.

Other means of separating the toe into sections are also within the scope of the present invention and it is useable for all tyres of the "TD" type including non standard diameters.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having now described our invention what we claim is:

1. A tire comprising a tread portion, sidewalls and a pair of spaced-apart beads, each containing a substantially inextensible annular bead core having bead seats and an extended toe portion made of an elastromeric material extending axially and radially inwards of the bead, the toe portion being rigid in the direction of its length so that in the use of the tire on a wheel rim having a groove complementary to the toe and in engagement with the toe, when an axially inward force is applied to the tread portion, a radially and axially outwardly extending force is generated at the bead core to affect bead retention, wherein the toe is subdivided in the circumferential directions of the tire by a plurality of substantially radial cuts having substantially no cross-sectional dimension such that when circumferentially adjacent portions of the toe are decoupled from one another the displacement of one of said portions does not dislodge or displace an adjacent portion.

2. The tire according to claim 1 wherein each radial cut extends substantially through the whole cross section of the toe.

3. The tire according to claim 1 wherein a plurality of sectional cuts are provided in the toe which extend through not more than 60% of the cross sectional area of the toe.

4. The tire according to claim 3 wherein the sectional cuts extend from the axially outer inside surface of the toe to the center line of the length of the toe, but not to the axial inner surface of the toe.

5. The tire according to claim 1 wherein the cuts have a width of not more than 4 mm.

6. The tire according to claim 1 wherein more than six cuts are provided around the circumference of the tire.

7. The tire according to claim 1 wherein the radial cuts are equally spaced around the tire.

8. The tire according to claim 1 wherein an additional decoupling cut is provided at the junction of the bead seat and the toe to reduce toe resistance to bending perpendicular to its own length.

* * * * *